United States Patent
Nakazawa

(10) Patent No.: US 10,137,608 B2
(45) Date of Patent: Nov. 27, 2018

(54) FILM-STRETCHING APPARATUS AND METHOD OF PRODUCING FILM

(71) Applicant: Sumitomo Chemical Company, Limited, Tokyo (JP)

(72) Inventor: Atsushi Nakazawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/682,856

(22) Filed: Aug. 22, 2017

(65) Prior Publication Data

US 2018/0079113 A1   Mar. 22, 2018

(30) Foreign Application Priority Data

Sep. 20, 2016 (JP) .................... 2016-183181

(51) Int. Cl.
| | |
|---|---|
| B29C 35/04 | (2006.01) |
| B29C 55/04 | (2006.01) |
| B29C 55/08 | (2006.01) |
| B29C 55/12 | (2006.01) |
| B01D 67/00 | (2006.01) |
| B29C 35/02 | (2006.01) |

(Continued)

(52) U.S. Cl.
CPC ........ B29C 35/045 (2013.01); B01D 67/0025 (2013.01); B01D 67/0027 (2013.01); B01D 67/0055 (2013.01); B29C 35/0288 (2013.01); B29C 55/04 (2013.01); B29C 55/085 (2013.01); B29C 55/12 (2013.01); H01M 2/145 (2013.01); B01D 67/0083 (2013.01); B01D 67/0086 (2013.01); B29C 35/06 (2013.01); B29C 55/165 (2013.01); B29K 2105/041 (2013.01); B29K 2105/256 (2013.01); B29L 2031/3468 (2013.01)

(58) Field of Classification Search
CPC ... B29C 35/0288; B29C 35/045; B29C 55/12; B29C 55/04; B01D 67/0027; B01D 67/0055; B01D 67/0025; B01D 67/0083; B01D 67/0086; H01M 2/145; B29L 2031/3468; B29K 2105/256; B29K 2105/041
See application file for complete search history.

(56) References Cited

U.S. PATENT DOCUMENTS 4,104,769 A * 8/1978 Levy ................... B29C 55/02
                                                         26/92
5,753,172 A * 5/1998 Forrest, Jr. ......... B29C 55/165
                                                         264/216

(Continued)

FOREIGN PATENT DOCUMENTS

| JP | 2004106266 | * | 4/2004 |
| JP | 2009-196356 A | | 9/2009 |

(Continued)

Primary Examiner — Jeffrey M Wollschlager
(74) Attorney, Agent, or Firm — Panitch Schwarze Belisario & Nadel LLP

(57) ABSTRACT

A film-stretching apparatus in accordance with an aspect of the present invention includes a stretching furnace which has (i) an entrance through which a material film is transferred into the stretching furnace and (ii) an exit through which the material film having been stretched is transferred out of the stretching furnace, an airflow in the entrance being controlled so as to be directed toward an outside of the stretching furnace.

18 Claims, 11 Drawing Sheets

(51) Int. Cl.
   *H01M 2/14*     (2006.01)
   *B29K 105/04*   (2006.01)
   *B29K 105/00*   (2006.01)
   *B29L 31/34*    (2006.01)
   *B29C 35/06*    (2006.01)
   *B29C 55/16*    (2006.01)

(56) References Cited

U.S. PATENT DOCUMENTS

| | | | | |
|---|---|---|---|---|
| 6,197,430 | B1* | 3/2001 | Asakura | B29C 55/16 |
| | | | | 264/288.4 |
| 7,132,065 | B2* | 11/2006 | Allen | B29C 55/165 |
| | | | | 264/2.7 |
| 2007/0275183 | A1* | 11/2007 | Hashimoto | B29C 55/06 |
| | | | | 428/1.2 |
| 2008/0246189 | A1* | 10/2008 | Kuzuhara | B29C 41/28 |
| | | | | 264/334 |
| 2009/0184446 | A1 | 7/2009 | Kawata et al. | |
| 2010/0002297 | A1* | 1/2010 | Shibuya | B29C 41/28 |
| | | | | 359/485.01 |
| 2010/0059036 | A1* | 3/2010 | Inoue | B29C 55/165 |
| | | | | 126/21 R |
| 2011/0223407 | A1* | 9/2011 | Ban | B01D 67/002 |
| | | | | 428/220 |
| 2012/0210599 | A1* | 8/2012 | Inoue | B29C 55/165 |
| | | | | 34/638 |
| 2014/0013612 | A1* | 1/2014 | Lee | B29C 55/08 |
| | | | | 34/202 |
| 2015/0004466 | A1 | 1/2015 | Yashiki et al. | |
| 2016/0139613 | A1* | 5/2016 | Brunner | B29C 49/36 |
| | | | | 264/523 |
| 2016/0306227 | A1* | 10/2016 | Kunai | G02B 5/3033 |

FOREIGN PATENT DOCUMENTS

| | | | |
|---|---|---|---|
| JP | 2013-159750 A | | 8/2013 |
| JP | 2007320276 | * | 12/2013 |
| JP | 2015042388 | * | 3/2015 |
| WO | WO2017115654 | * | 7/2017 |

* cited by examiner

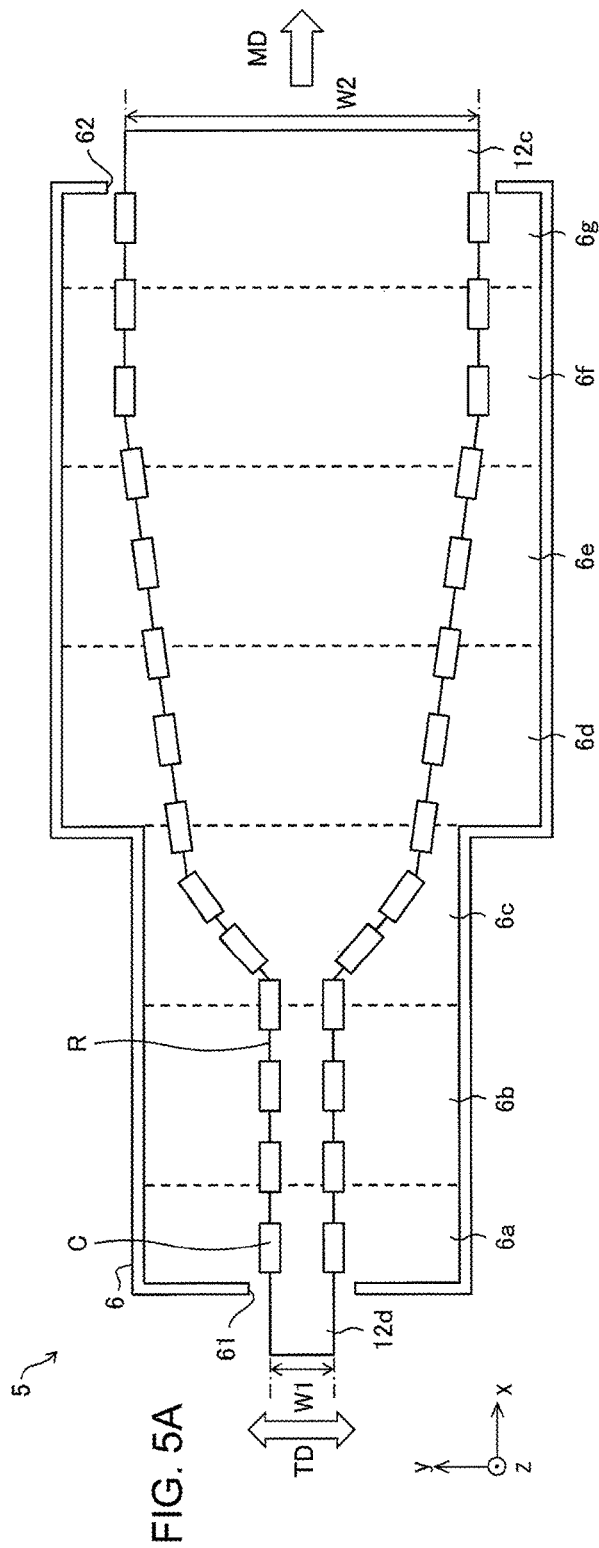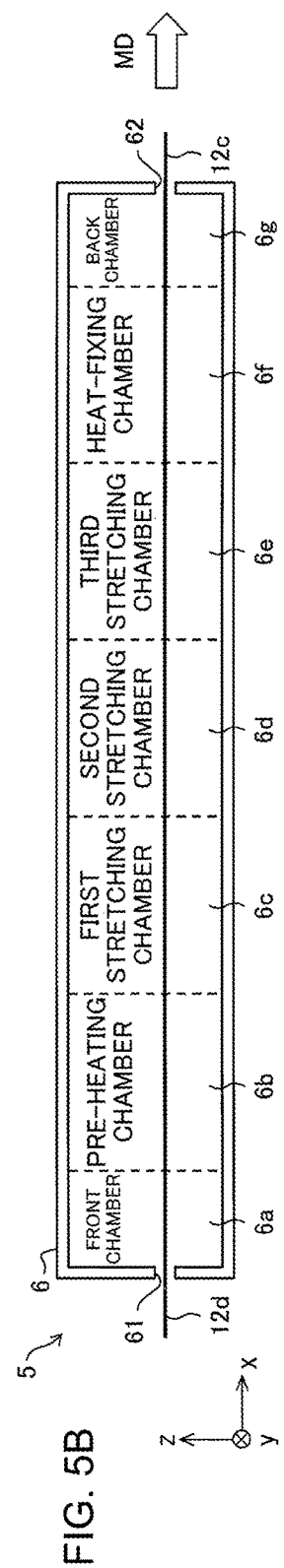

FILM-STRETCHING APPARATUS AND METHOD OF PRODUCING FILM

This Nonprovisional application claims priority under 35 U.S.C. § 119 on Patent Application No. 2016-183181 filed in Japan on Sep. 20, 2016, the entire contents of which are hereby incorporated by reference.

TECHNICAL FIELD

The present invention relates to (i) a film-stretching apparatus and (ii) a method of producing a film.

BACKGROUND ART

As a separator for use in a nonaqueous electrolyte secondary battery such as a lithium ion secondary battery, there has been used (i) a microporous film which contains a polyolefin as its main component or (ii) a laminated porous film obtained by stacking a functional layer on the microporous film which serves as a base material.

In a process of producing such a film, the film is longitudinally or transversely stretched so as to control a pore structure of the film. Patent Literature 1 discloses that a polyolefin microporous film suitable for a base material porous film serving as a separator can be produced with high productivity, by causing a plurality of stretching regions in a stretching furnace of a film-stretching apparatus to have respective different film widening speeds and respective different temperatures such that the film widening speeds and the temperatures are in a specific relationship.

CITATION LIST

Patent Literature

[Patent Literature 1]
Japanese Patent Application Publication Tokukai No. 2013-159750 (Publication date: Aug. 19, 2013)

SUMMARY OF INVENTION

Technical Problem

According to the above conventional technique, however, since a pressure in the stretching furnace is set to be equal to an atmospheric pressure, it is likely that cold external air enters the stretching furnace from outside and, consequently, a volatile component, which was contained in the film but has been volatilized by heating and is filling the stretching furnace, is condensed and deposited. The volatile component thus condensed and deposited in the stretching furnace can drop or fall on the film, and can consequently cause damage to the film.

The present invention has been made in view of the above problem, and an object of the present invention is to realize (i) a film-stretching apparatus and (ii) a method of producing a film, each of which allows a reduction in damage to a film which damage is caused by condensation and deposition of a volatile component in a stretching furnace.

Solution to Problem

In order to attain the above object, a film-stretching apparatus in accordance with an aspect of the present invention is a film-stretching apparatus for stretching a film, including: a stretching furnace having (i) an entrance through which the film is transferred into the stretching furnace and (ii) an exit through which the film is transferred out of the stretching furnace, an airflow in the entrance being controlled so as to be directed toward an outside of the stretching furnace.

In order to attain the above object, a method of producing a film in accordance with an aspect of the present invention includes: a film stretching step of stretching a film, the film stretching step being carried out by use of a film-stretching apparatus which includes a stretching furnace having (i) an entrance through which the film is transferred into the stretching furnace and (ii) an exit through which the film is transferred out of the stretching furnace, in the film stretching step, an airflow in the entrance being controlled so as to be directed toward an outside of the stretching furnace.

Advantageous Effects of Invention

According to the present invention, it is possible to provide (i) a film-stretching apparatus and (ii) a method of producing a film, each of which allows a reduction in damage to a film which damage is caused by condensation and deposition of a volatile component in a stretching furnace.

Particularly, for the following reasons, an embodiment of the present invention can be suitably applied to a case where a polyolefin film, to be used as a separator for a nonaqueous electrolyte secondary battery, is stretched.

A polyolefin film is rarely used alone as a separator, and, as will be later described, a functional layer is often stacked on the polyolefin film by applying a coating material to the polyolefin film. In a case where (i) a volatile component having been volatilized from the polyolefin film is condensed and deposited and (ii) the volatile component thus condensed and deposited causes damage to part of the polyolefin film, that part of the polyolefin film varies in wettability. This causes the part of the polyolefin film to repel the coating material. In order that the polyolefin film is prevented from repelling the coating material and a functional layer (i.e., a coating layer) is uniformly formed on the polyolefin film, an embodiment of the present invention can be suitably applied to a case where the polyolefin film is stretched.

A separator has a porous structure so as to allow lithium ions to move between a cathode and an anode while causing the cathode and the anode to be separated (later described). In a case where (i) the volatile component having been volatilized from the polyolefin film is condensed and deposited and (ii) the volatile component thus condensed and deposited causes damage to part of the polyolefin film, that part of the polyolefin film cannot function as a separator because pores in the part of the polyolefin film are blocked by such a condensed and deposited volatile component. In order that such partial blocking of pores in the polyolefin film is prevented, an embodiment of the present invention can be suitably applied to a case where the polyolefin film is stretched.

Moreover, in a case where a liquid plasticizing agent is employed as a pore forming agent in production of a separator, the polyolefin film is stretched in a state where the polyolefin film contains a large amount of the plasticizing agent. In a case where the plasticizing agent having been volatilized from the polyolefin film is condensed and drops on the polyolefin film, a polymer density locally decreases in part of the polyolefin film on which part the plasticizing agent has dropped. This may cause (i) that part of the polyolefin film to be different in pore structure from the other part of the polyolefin film and/or (ii) that part of the polyolefin film to have a pinhole. In order that the polyolefin film has a uniform pore structure, an embodiment of the present invention can be suitably applied to a case where the polyolefin film is stretched.

Figure 1:
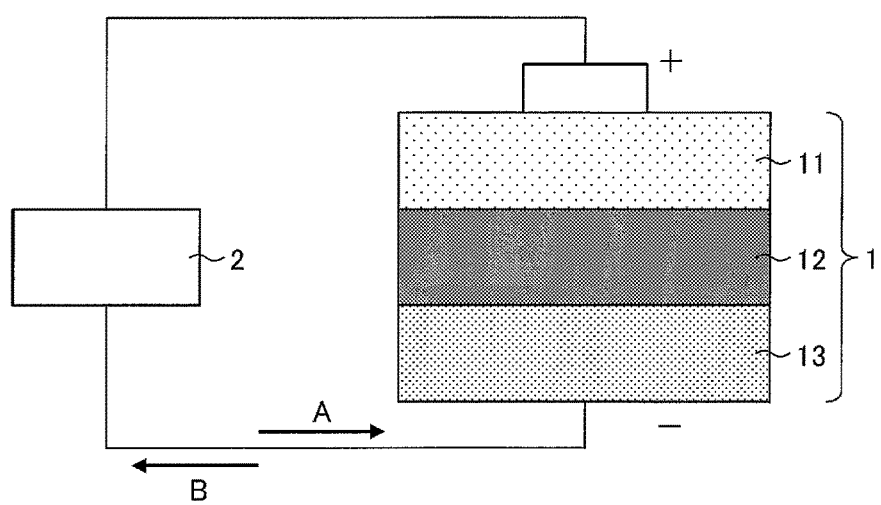
FIG. 1 is a diagram schematically illustrating a cross-sectional configuration of a lithium ion secondary battery.
Figure 2A:
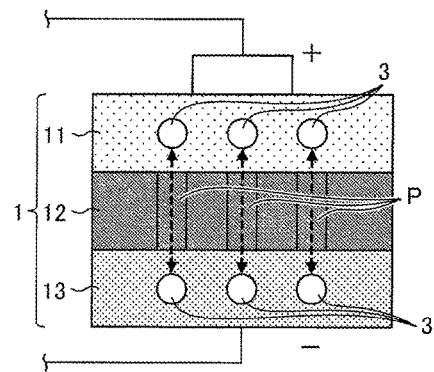
Figure 2B:
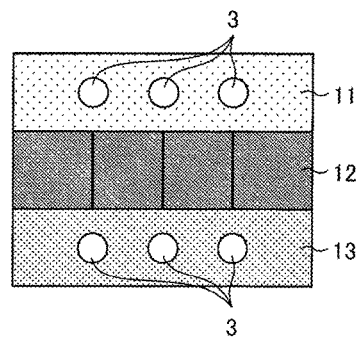
Figure 2C:
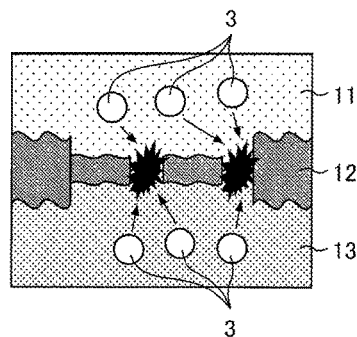

Each of FIGS. 2A-2C is a diagram schematically illustrating a state of the lithium ion secondary battery illustrated in FIG. 1.

Figures 3A, 3B:
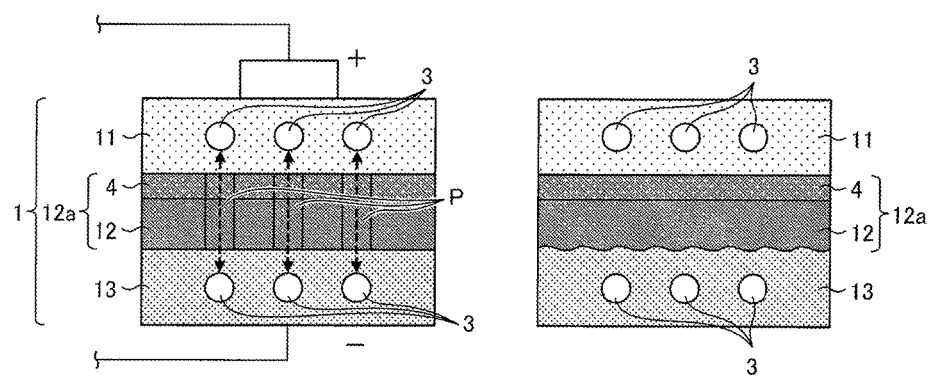

Each of FIGS. 3A-3B is a diagram schematically illustrating a state of a lithium ion secondary battery having another configuration.

Figure 4:
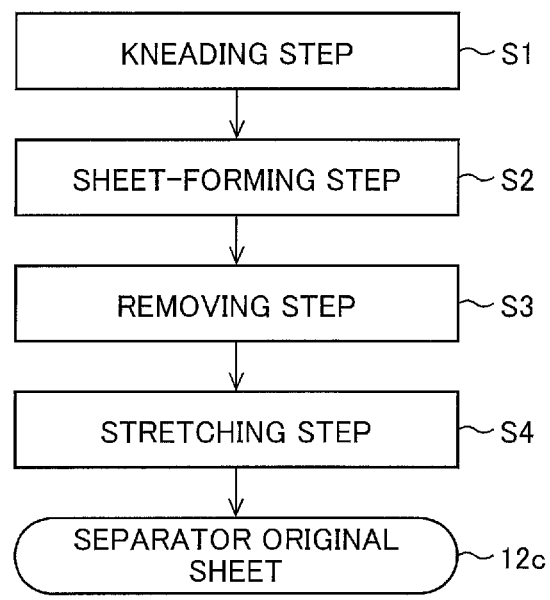

FIG. 4 is a flowchart schematically showing a method of producing an original sheet of a separator.

Each of FIGS. 5A-5B is a cross-sectional view illustrating how a stretching step is carried out by use of a film-stretching apparatus.

Figure 6:
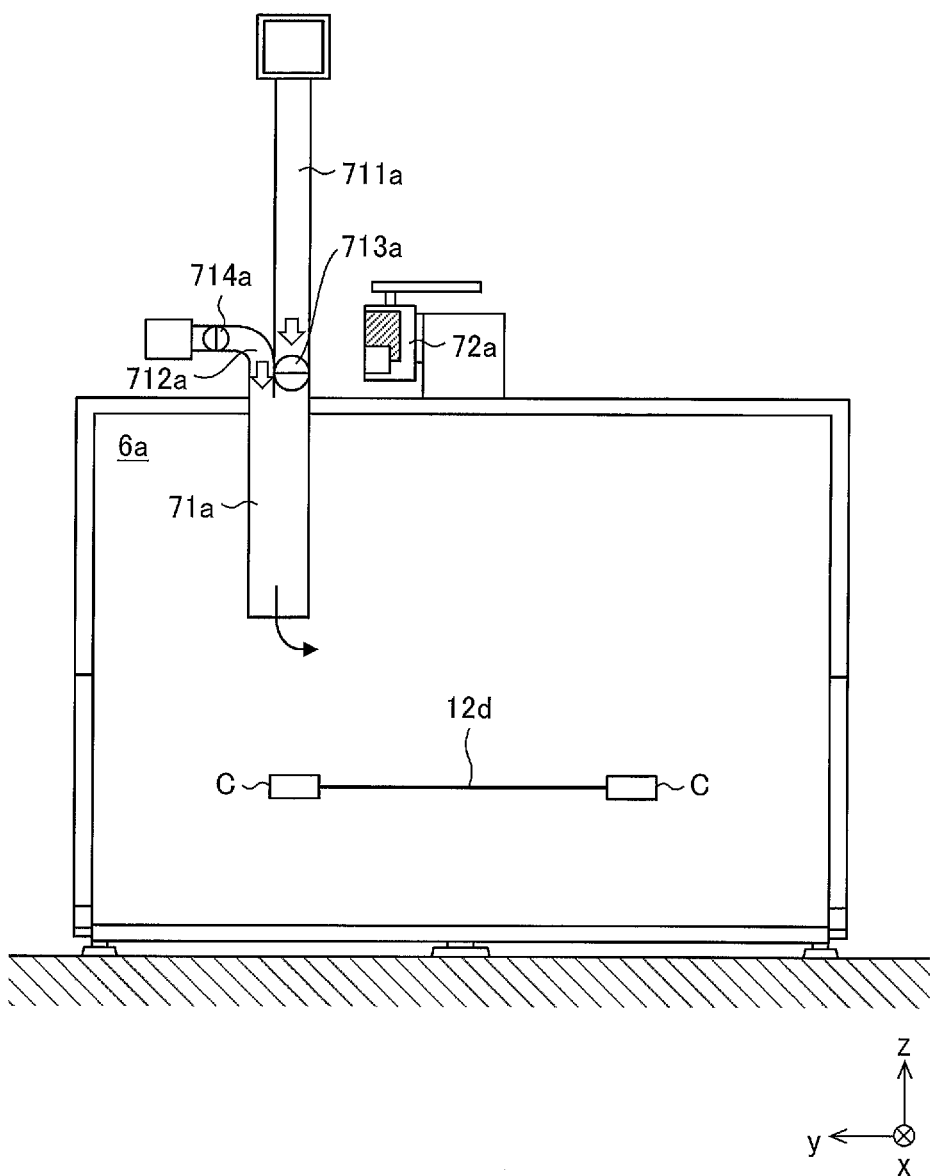

FIG. 6 is a cross-sectional view illustrating a front chamber of a stretching furnace included in the film-stretching apparatus.

Figure 7:
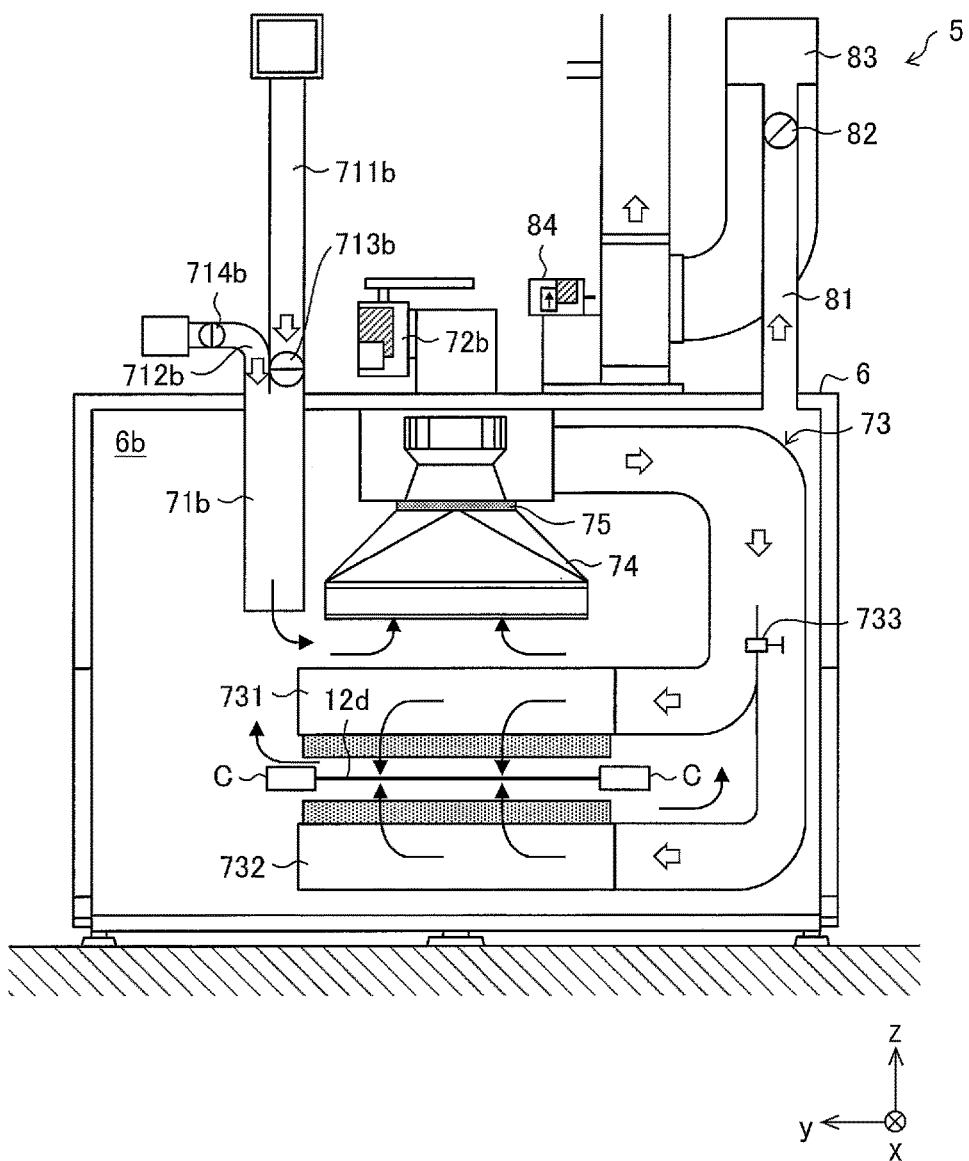

FIG. 7 is a cross-sectional view illustrating a pre-heating chamber of the stretching furnace.

Figure 8A:
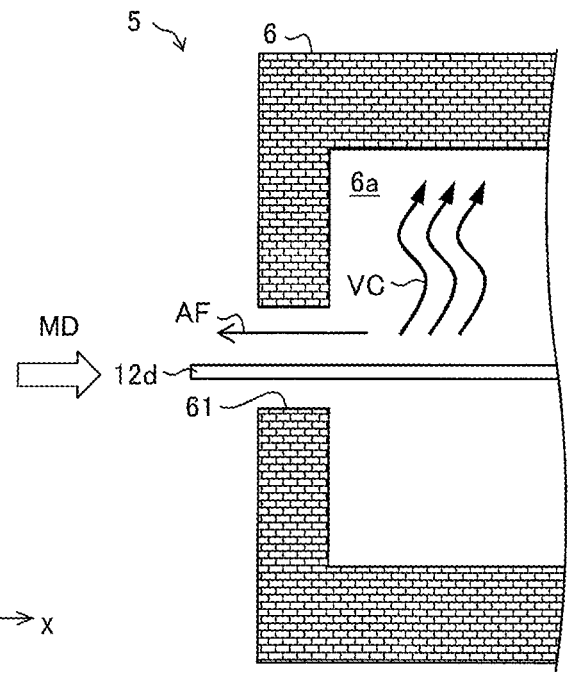
Figure 8B:
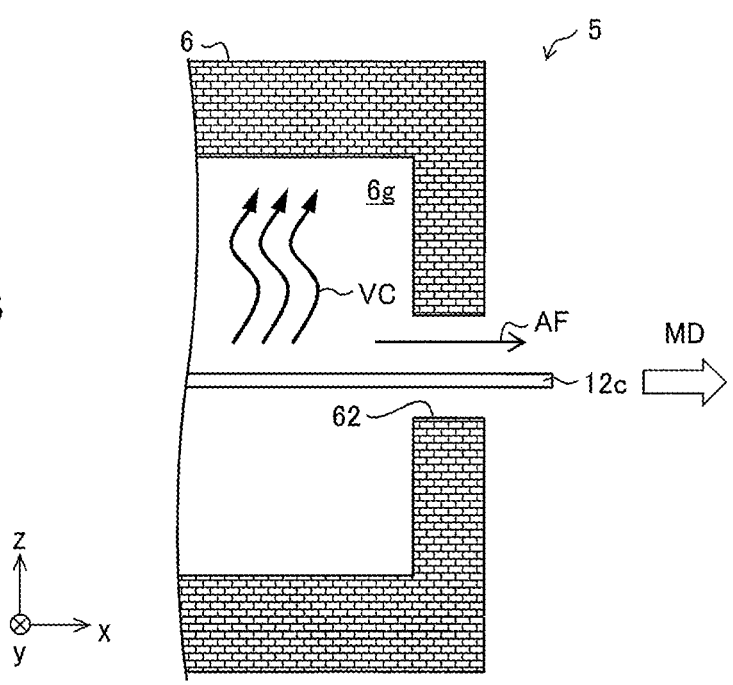

FIG. 8A is a cross-sectional view illustrating an airflow in an entrance of the stretching furnace. FIG. 8B is a cross-sectional view illustrating an airflow in an exit of the stretching furnace.

Figure 9:
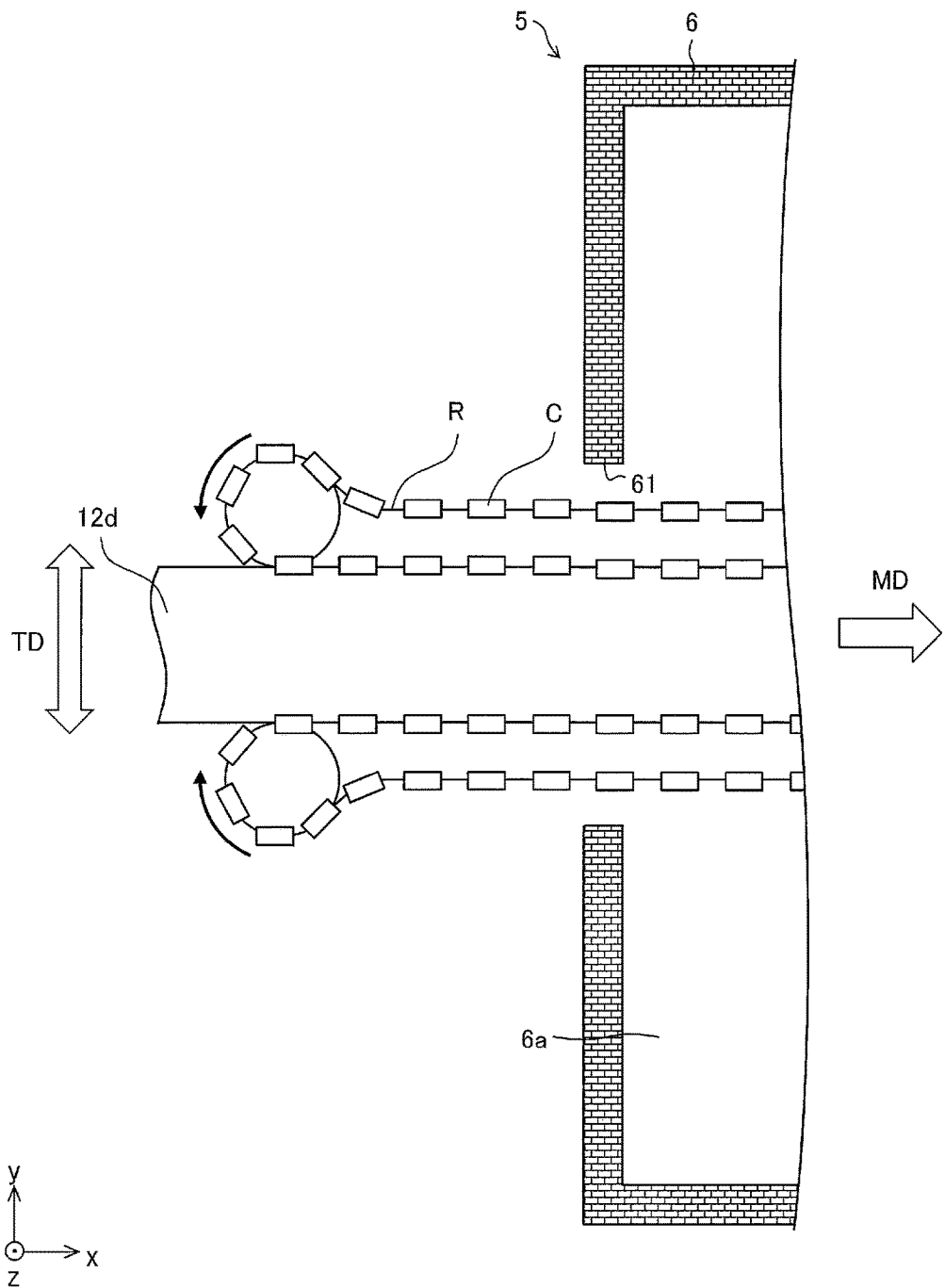

FIG. 9 is a cross-sectional view illustrating an example configuration in the vicinity of the entrance of the stretching furnace of the film-stretching apparatus.

Figure 10:
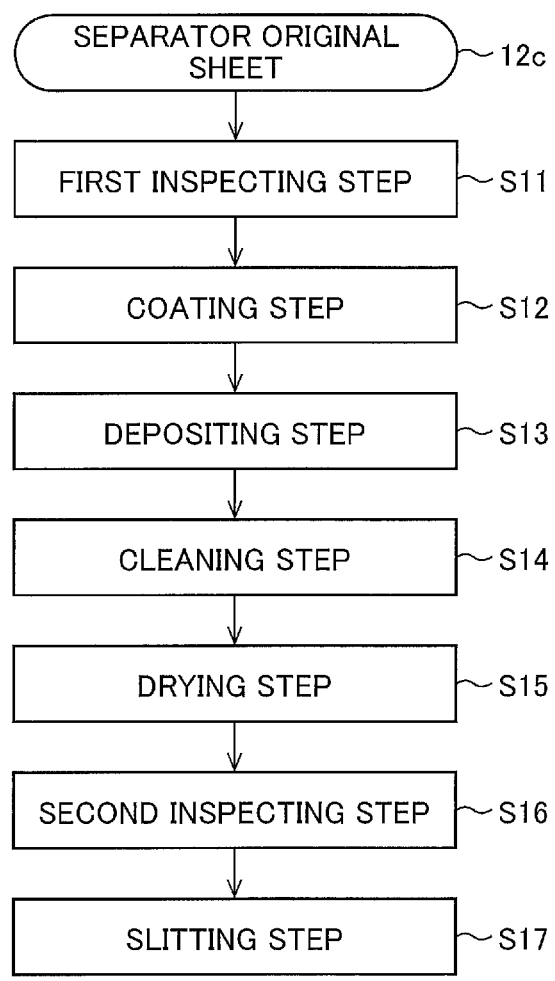

FIG. 10 is a flowchart schematically showing a method of producing a separator.

Figure 11A:
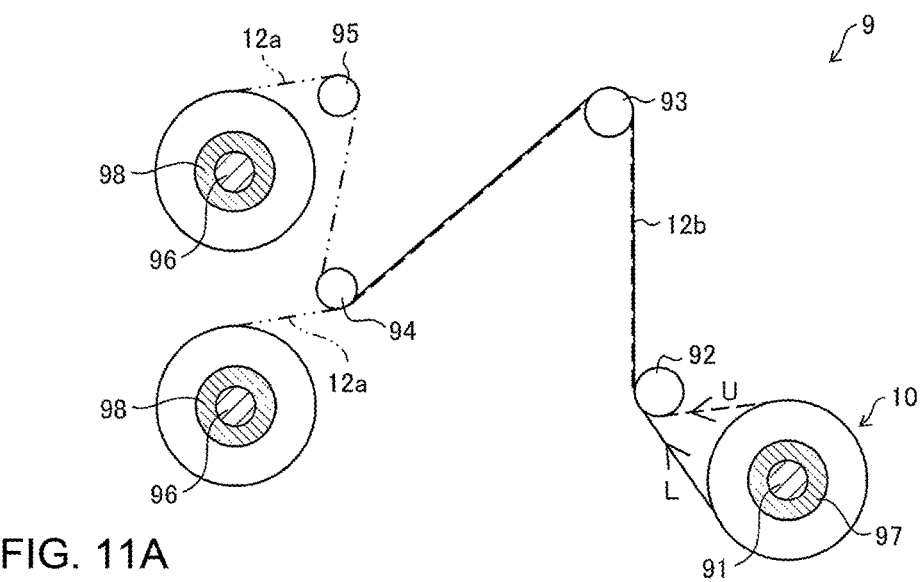
Figure 11B:
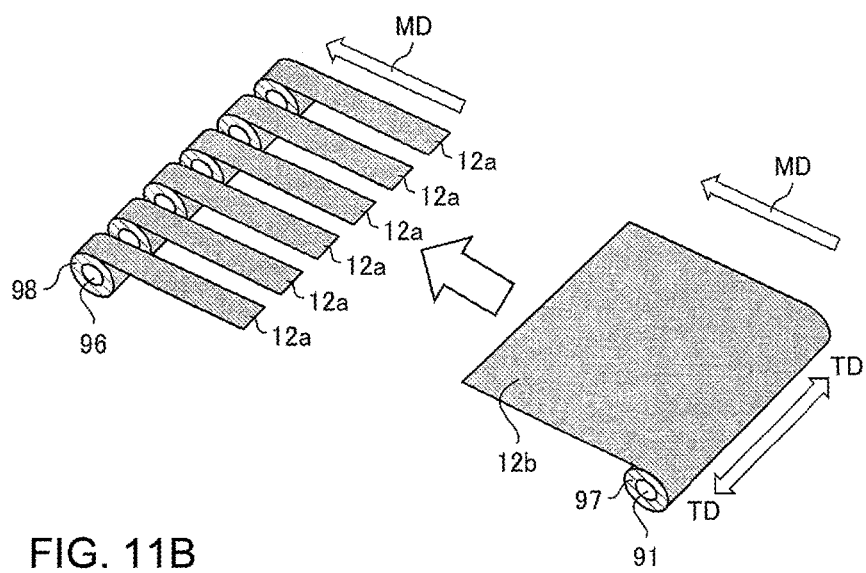

Each of FIGS. 11A-11B is a diagram schematically illustrating an example of a slitting step.

DESCRIPTION OF EMBODIMENTS

Embodiment 1

The following description will discuss an embodiment of the present invention with reference to FIGS. 1 through 9. In Embodiment 1, an example case will be described in which a film-stretching apparatus in accordance with an embodiment of the present invention is applied to production of an original sheet of a separator (hereinafter referred to as a "separator original sheet") which original sheet serves as a base material of a separator for a lithium ion secondary battery (hereinafter, sometimes referred to as a "separator").

First, the lithium ion secondary battery will be described below with reference to FIGS. 1 through 3B.

(Configuration of Lithium Ion Secondary Battery)

A nonaqueous electrolyte secondary battery, typified by a lithium ion secondary battery, has a high energy density, and is therefore currently widely used as (i) batteries for use in devices such as personal computers, mobile phones, and mobile information terminals, (ii) batteries for use in moving bodies such as automobiles and airplanes, and (iii) stationary batteries contributing to stable power supply.

FIG. 1 is a diagram schematically illustrating a cross-sectional configuration of a lithium ion secondary battery 1. As illustrated in FIG. 1, the lithium ion secondary battery 1 includes a cathode 11, a separator 12, and an anode 13. An external device 2 is provided outside the lithium ion secondary battery 1 such that the external device 2 is connected to the cathode 11 and the anode 13. While the lithium ion secondary battery 1 is being charged, electrons move in a direction A. On the other hand, while the lithium ion secondary battery 1 is being discharged, the electrons move in a direction B.

(Separator)

The separator (film) 12 is provided so as to be sandwiched between the cathode 11, which is a positive electrode of the lithium ion secondary battery 1, and the anode 13, which is a negative electrode of the lithium ion secondary battery 1. The separator 12 causes the cathode 11 and the anode 13 to be separated, while allowing lithium ions to move between the cathode 11 and the anode 13. For example, a polyolefin such as polyethylene or polypropylene is used as a base material of the separator 12.

Each of FIGS. 2A-2C schematically illustrates a state of the lithium ion secondary battery 1 illustrated in FIG. 1. FIG. 2A illustrates a normal state. FIG. 2B illustrates a state in which a temperature of the lithium ion secondary battery 1 has risen. FIG. 2C illustrates a state in which the temperature of the lithium ion secondary battery 1 has sharply risen.

As illustrated in FIG. 2A, the separator 12 is provided with many pores P. Normally, lithium ions 3 in the lithium ion secondary battery 1 can move back and forth through the pores P.

Here, the temperature of the lithium ion secondary battery 1 may rise due to, for example, excessive charging of the lithium ion secondary battery 1 or a high electric current caused by short-circuiting of the external device. In such cases, the separator 12 melts or softens, so that the pores P are blocked as illustrated in FIG. 2B. As a result, the separator 12 shrinks. This stops back-and-forth movement of the lithium ions 3, and consequently stops the above-described temperature rise.

However, in a case where the temperature of the lithium ion secondary battery 1 sharply rises, the separator 12 suddenly shrinks. In this case, as illustrated in FIG. 2C, the separator 12 may be destroyed. This causes the lithium ions 3 to leak out from the separator 12 which has been destroyed. As a result, the lithium ions 3 do not stop moving back and forth. Consequently, the temperature continues rising.

(Heat-Resistant Separator)

Each of FIG. 3A-3B schematically illustrates a state of the lithium ion secondary battery 1 having another configuration. FIG. 3A illustrates a normal state, and FIG. 3B illustrates a state in which the temperature of the lithium ion secondary battery 1 has sharply risen.

As illustrated in FIG. 3A, the lithium ion secondary battery 1 can further include a heat-resistant layer (functional layer) 4. The heat-resistant layer 4 can be provided on the separator 12. FIG. 3A illustrates a configuration in which the heat-resistant layer 4 serving as a functional layer is provided on the separator 12. A film in which the heat-resistant layer 4 is provided on the separator 12 is hereinafter referred to as a heat-resistant separator (film) 12a.

In the configuration illustrated in FIG. 3A, the heat-resistant layer 4 is stacked on one of surfaces of the separator 12 which one is located on a cathode 11 side. Note that the heat-resistant layer 4 can alternatively be stacked on the other one of the surfaces of the separator 12 which other one is located on an anode 13 side or can alternatively be stacked on each of the surfaces of the separator 12. The heat-resistant layer 4 is also provided with pores which are similar to the pores P. Normally, the lithium ions 3 move back and forth through (i) the pores P and (ii) the pores of the heat-resistant layer 4. The heat-resistant layer 4 contains, for example, a wholly aromatic polyamide (aramid resin) as its material.

As illustrated in FIG. 3B, even in a case where the temperature of the lithium ion secondary battery 1 sharply rises and, as a result, the separator 12 melts or softens, a shape of the separator 12 is maintained because the heat-resistant layer 4 supports the separator 12. This causes the separator 12 to come off with melting or softening. Consequently, the pores P are only blocked up. This stops the back-and-forth movement of the lithium ions 3, and consequently stops the above-described excessive discharging or excessive charging. In this way, the separator 12 is prevented from being destroyed.

(Method of Producing Separator Original Sheet)

Next, a method of producing a separator original sheet which is to be used as a base material of a separator (film production method) will be described below with reference to FIG. 4. In Embodiment 1, an example case will be described in which the separator original sheet contains polyethylene as its main material.

FIG. 4 is a flowchart schematically showing a method of producing a separator original sheet 12c. The following flow of producing the separator original sheet 12c is exemplified by a method in which (i) a solid or liquid pore forming agent is added to a thermoplastic resin, (ii) a resultant resin composition is formed into a film, and then (iii) the pore forming agent is removed by use of an appropriate solvent. Specifically, in a case where the separator original sheet 12c is made of a polyethylene resin which contains ultra-high molecular weight polyethylene, the flow of producing the separator original sheet 12c includes a kneading step S1, a sheet-forming step S2, a removing step S3, and a stretching step S4 which are carried out in this order. Note that the removing step S3 and the stretching step S4 can be alternatively carried out in reversed order.

The kneading step S1 is a step of kneading ultra-high molecular weight polyethylene and a pore forming agent, such as calcium carbonate, so as to obtain a polyethylene resin composition. In the kneading step S1, for example, (i) a pore forming agent is added to an ultra-high molecular weight polyethylene powder, (ii) the ultra-high molecular weight polyethylene powder and the pore forming agent are mixed together, and (iii) a resultant mixture is melted and kneaded by use of, for example, a twin screw kneading extruder. A polyethylene resin composition is thus obtained.

The sheet-forming step S2 is a step of forming, into a film, the polyethylene resin composition obtained in the kneading step S1. In the sheet-forming step S2, for example, the polyethylene resin composition obtained in the kneading step S1 is rolled by use of a pair of rollers so that the polyethylene resin composition is formed into a film. A material film is thus obtained.

The removing step S3 is a step of removing the pore forming agent from the material film obtained in the sheet-forming step S2. In the removing step S3, for example, the material film is immersed in a hydrochloric acid aqueous solution or the like so as to dissolve the pore forming agent such as calcium carbonate. The pore forming agent is thus removed from the material film.

The stretching step S4 is a step of stretching the material film from which the pore forming agent has been removed in the removing step S3, so as to obtain a separator original sheet 12c. The stretching step S4 is carried out by use of a film-stretching apparatus. The material film is stretched in a machine direction (i.e., a direction in which the material film is transferred) and/or a transverse direction (i.e., a width direction of the material film) while being transferred in a stretching furnace of the film-stretching apparatus. The stretching step S4 can further include a step of stretching the material film in the machine direction by use of a plurality of heated rollers. Note that the film-stretching apparatus will be later described in detail.

According to the above flow of producing the separator original sheet 12c, many micropores are formed in the material film in the removing step S3. The micropores in the material film which has been stretched in the stretching step S4 serve as the respective pores P. The separator original sheet 12c which is a polyethylene microporous film having a given thickness and a given air permeability is thus produced.

Note that the separator original sheet 12c can be produced through a similar flow, even in a case where the separator original sheet 12c contains another material. Note also that the method of producing the separator original sheet 12c is not limited to the above method in which the pore forming agent is removed, and various methods can be alternatively employed to produce the separator original sheet 12c.

(Film-Stretching Apparatus)

Next, a film-stretching apparatus 5 by use of which the stretching step (film-stretching step) S4 is carried out will be described below with reference to FIGS. 5A through 9.

Each of FIGS. 5A-5B is a cross-sectional view illustrating how the stretching step S4 is carried out by use of the film-stretching apparatus 5. FIG. 5A illustrates a cross section of the film-stretching apparatus 5 which cross section is obtained by cutting the film-stretching apparatus 5 along a plane parallel to a machine direction MD and a transverse direction TD of a material film 12d. FIG. 5B illustrates a cross section of the film-stretching apparatus 5 which cross section is obtained by cutting the film-stretching apparatus 5 along a plane perpendicular to the transverse direction TD.

The film-stretching apparatus 5 is a tenter-type stretching apparatus which stretches the material film 12d by a tenter stretching method. The tenter-type stretching apparatus has such a mechanism that a plurality of chucks, which hold both sides of a film, move on tenter rails, which are continuously provided so as to extend from an entrance of a stretching furnace toward an exit of the stretching furnace, so that the film is uniaxially or biaxially stretched continuously.

The film-stretching apparatus 5 includes a stretching furnace 6 in which the material film 12d is stretched. The stretching furnace 6 has (i) an entrance 61 through which the material film 12d is transferred into the stretching furnace 6 and (ii) an exit 62 through which the material film 12d having been stretched (i.e., the separator original sheet 12c) is transferred out of the stretching furnace 6.

In the film-stretching apparatus 5, the material film 12d having been transferred into the film-stretching apparatus 5 through the entrance 61 is stretched in the transverse direction (width direction) TD by the tenter stretching method while being transferred in the machine direction MD. A separator original sheet 12c, which is obtained by thus stretching the material film 12d, is transferred out of the film-stretching apparatus 5 through the exit 62.

The stretching furnace 6 is divided, along the machine direction MD of the material film 12d, into a plurality of air amount control zones in each of which an amount of air is independently controllable. Specifically, the stretching furnace 6 includes a front chamber 6a, a pre-heating chamber 6b, a first stretching chamber 6c, a second stretching chamber 6d, a third stretching chamber 6e, a heat-fixing chamber 6f, and a back chamber 6g which are located in this order from an entrance 61 side. In Embodiment 1, out of those chambers, each of the front chamber 6a and the back chamber 6g is configured such that an amount of air therein is independently controllable. Meanwhile, each of the pre-heating chamber 6b, the first stretching chamber 6c, the second stretching chamber 6d, the third stretching chamber 6e, and the heat-fixing chamber 6f is configured such that an amount of air and an operating temperature therein are independently controllable.

Alternatively, each of the front chamber 6a, the pre-heating chamber 6b, the first stretching chamber 6c, the second stretching chamber 6d, the third stretching chamber 6e, the heat-fixing chamber 6f, and the back chamber 6g can be arranged such that an amount of air and an operating temperature therein are independently controllable.

Table 1 below shows examples of (i) a function of each of the chambers (rooms), (ii) whether air is supplied to and/or discharged from each of the chambers, (iii) whether a film is stretched in each of the chambers, and (iv) an operating temperature range in each of the chambers.

TABLE 1

| Name of room | Function | Supply and discharge of air | Whether film is transversely stretched | Operating temperature range |
|---|---|---|---|---|
| Front chamber | Prevention of entering of external air | Supply only | No | No temperature control |
| Pre-heating chamber | Pre-heating of film | Supply and discharge | No | 115-125 |
| First stretching chamber | Transverse stretching | Supply and discharge | Yes | 100-115 |
| Second stretching chamber | Transverse stretching | Supply and discharge | Yes | 100-115 |
| Third stretching chamber | Transverse stretching | Supply and discharge | Yes | 100-115 |
| Heat-fixing chamber | Structural fixation (prevention of thermal shrinkage) | Supply and discharge | No | 115-130 |
| Back chamber | Prevention of entering of external air | Supply only | No | No temperature control |

The front chamber 6a is a zone for preventing external air from entering the stretching furnace 6 through the entrance 61.

The pre-heating chamber 6b is a zone for pre-heating the material film 12d prior to stretching of the material film 12d.

Each of the first stretching chamber 6c, the second stretching chamber 6d, and the third stretching chamber 6e is a zone for stretching the material film 12d in the transverse direction TD (i.e., transversely stretching the material film 12d).

The heat-fixing chamber 6f is a zone for fixing a structure of the material film 12d having been stretched, so as to (i) increase a thermal stability of the material film 12d and (ii) prevent thermal shrinkage of the material film 12d.

The back chamber 6g is a zone for preventing external air from entering the stretching furnace 6 through the exit 62.

Note that, in Embodiment 1, a width (i.e., a length in the transverse direction TD) of each of the second stretching chamber 6d, the third stretching chamber 6e, the heat-fixing chamber 6f, and the back chamber 6g is set so as to be greater than a width of each of the front chamber 6a, the pre-heating chamber 6b, and the first stretching chamber 6c.

According to the stretching furnace 6, each of the front chamber 6a, connected to the entrance 61, and the back chamber 6g, connected to the exit 62, is configured such that air can be merely supplied thereto. Meanwhile, each of the pre-heating chamber 6b, the first stretching chamber 6c, the second stretching chamber 6d, the third stretching chamber 6e, and the heat-fixing chamber 6f, which are located between the front chamber 6a and the back chamber 6g, is configured such that (i) air can be supplied thereto and discharged therefrom and (ii) an operating temperature therein is independently controllable. For example, a temperature in the pre-heating chamber 6b is controlled within a range of 115° C. to 125° C. during operation. A temperature in each of the first stretching chamber 6c, the second stretching chamber 6d, and the third stretching chamber 6e is controlled within a range of 100° C. to 115° C. during operation. A temperature in the heat-fixing chamber 6f is controlled within a range of 115° C. to 130° C. during operation. By thus configuring each of the pre-heating chamber 6b, the first stretching chamber 6c, the second stretching chamber 6d, the third stretching chamber 6e, and the heat-fixing chamber 6f such that the operating temperature therein is independently controllable, it is possible to appropriately set an optimal temperature in accordance with a stretching condition of the material film 12d.

The air discharge duct for discharging air is connected to a ceiling of each of the pre-heating chamber 6b, the first stretching chamber 6c, the second stretching chamber 6d, the third stretching chamber 6e, and the heat-fixing chamber 6f. Each air discharge duct is connected to a collecting duct. Air, having been taken in the collecting duct from each chamber through a corresponding air discharge duct, is discharged outside by action of an air discharge fan which is connected to the collecting duct. An amount of air to be discharged from each of the pre-heating chamber 6b, the first stretching chamber 6c, the second stretching chamber 6d, the third stretching chamber 6e, and the heat-fixing chamber 6f is independently controlled by use of an air discharge damper which is provided in the air discharge duct.

An air supply duct for supplying heated air and cool air is connected to a/the ceiling of each of the front chamber 6a, the pre-heating chamber 6b, the first stretching chamber 6c, the second stretching chamber 6d, the third stretching chamber 6e, the heat-fixing chamber 6f, and the back chamber 6g. An amount of air to be supplied to each of the front chamber 6a, the pre-heating chamber 6b, the first stretching chamber 6c, the second stretching chamber 6d, the third stretching chamber 6e, the heat-fixing chamber 6f, and the back chamber 6g is independently controlled (i) by use of an air supply damper which is provided in the air supply duct and (ii) by control of an amount of air to be caused to flow by an air supply fan which is separately attached to the ceiling of each of the chambers.

FIG. 6 is a cross-sectional view illustrating the front chamber 6a of the stretching furnace 6. FIG. 6 illustrates a cross section of the front chamber 6a which cross section is obtained by cutting the front chamber 6a along a plane perpendicular to the machine direction MD. Note that the front chamber 6a is substantially identical in main configuration to the back chamber 6g, and therefore the front chamber 6a will be described below as an example.

An air supply duct 71a through which heated air and cool air are supplied to the front chamber 6a is connected to the ceiling of the front chamber 6a (see FIG. 6). The air supply duct 71a is made up of (i) a heated air supply duct 711a for supplying heated air (at a temperature of 90° C. to 120° C.) to the front chamber 6a and (ii) a cool air supply duct 712a for supplying, to the front chamber 6a, ambient air in a factory.

An air supply fan 72a is also attached to the ceiling of the front chamber 6a. An amount of air to be supplied to the front chamber 6a is controlled (i) by use of (a) a heated air supply damper 713a, which is provided in the heated air supply duct 711a, and (b) a cool air supply damper 714a, which is provided in the cool air supply duct 712a, and (ii) by control of an amount of air to be caused to flow by the air supply fan 72a, which is attached to the ceiling of the front chamber 6a.

FIG. 7 is a cross-sectional view illustrating the pre-heating chamber 6b of the stretching furnace 6. FIG. 7 illustrates a cross section of the pre-heating chamber 6b which cross section is obtained by cutting the pre-heating chamber 6b along a plane perpendicular to the machine direction MD. Note that the pre-heating chamber 6b is substantially identical in main configuration to the first stretching chamber 6c, the second stretching chamber 6d, the third stretching chamber 6e, and the heat-fixing chamber 6f, and therefore those chambers will be exemplified by the pre-heating chamber 6b below.

An air supply duct 71b through which heated air and cool air are supplied to heating chamber 6b is connected to the ceiling of the pre-heating chamber 6b (see FIG. 7). The air supply duct 71b is made up of (i) a heated air supply duct 711b for supplying heated air (at a temperature of 90° C. to 120° C.) to the pre-heating chamber 6b and (ii) a cool air supply duct 712b for supplying, to the pre-heating chamber 6b, ambient air in the factory.

An air supply fan 72b is also attached to the ceiling of the pre-heating chamber 6b. An amount of air to be supplied to the pre-heating chamber 6b is controlled (i) by use of (a) a heated air supply damper 713b, which is provided in the heated air supply duct 711b, and (b) a cool air supply damper 714b, which is provided in the cool air supply duct 712b, and (ii) by control of an amount of air to be caused to flow by the air supply fan 72b, which is attached to the ceiling of the pre-heating chamber 6b.

In the pre-heating chamber 6b, by action of the air supply fan 72b, air is (i) supplied to the pre-heating chamber 6b through the air supply duct 71b, (ii) heated, (iii) taken in a blower duct 73, and then (iv) emitted toward the material film 12d, so that the material film 12d is heated.

Specifically, the air having been supplied to the pre-heating chamber 6b through the air supply duct 71b is introduced into the blower duct 73 through a hopper 74, by action of the air supply fan 72b. In so doing, the air having been taken in the hopper 74 is heated by a heater 75 which is attached to the hopper 74. The air thus heated by the heater 75 is then introduced into the blower duct 73.

An end of the blower duct 73 branches into an upper nozzle duct 731 and a lower nozzle duct 732. The upper nozzle duct 731 is provided so as to be located above the material film 12d transferred in the pre-heating chamber 6b, and the lower nozzle duct 732 is provided so as to be located below the material film 12d transferred in the pre-heating chamber 6b.

A surface of the upper nozzle duct 731 which surface is to face an upper surface of the material film 12d has a plurality of openings through which heated air is emitted toward the upper surface of the material film 12d. A surface of the lower nozzle duct 732 which surface is to face a lower surface of the material film 12d has a plurality of openings through which heated air is emitted toward the lower surface of the material film 12d. This makes it possible to uniformly heat the upper surface and the lower surface of the material film 12d.

A blower damper 733 is provided at a part where the blower duct 73 branches into the upper nozzle duct 731 and the lower nozzle duct 732. An amount of air to be emitted toward the material film 12d is controlled by use of the blower damper 733.

An air discharge duct 81 for discharging air from the pre-heating chamber 6b is also connected to the ceiling of the pre-heating chamber 6b. The air discharge duct 81 is connected to a collecting duct 83. Air, having been taken in the collecting duct 83 from the pre-heating chamber 6b through the air discharge duct 81, is discharged outside by action of an air discharge fan 84, which is connected to the collecting duct 83. An amount of air to be discharged from the pre-heating chamber 6b is controlled by use of an air discharge damper 82, which is provided in the air discharge duct 81.

According to the film-stretching apparatus 5 configured as described above, both sides of a material film 12d having a width W1 (e.g., a width of approximately 30 cm) are first fixed by chucks C provided on tenter rails R. By the chucks C moving on the tenter rails R in the machine direction MD, the material film 12d is transferred into the stretching furnace 6 through the entrance 61. Note that the entrance 61 has a width which is set so that (i) the material film 12d and (ii) the tenter rails R, each of which is provided so as to be looped (see FIG. 9), can be laid in the entrance 61. The entrance 61 has a height which is set to approximately 25 cm.

The material film 12d moved in the machine direction MD in accordance with movement of the chucks C is transferred into the pre-heating chamber 6b via the front chamber 6a, and then heated in the pre-heating chamber 6b.

In the pre-heating chamber 6b, the material film 12d is heated to a temperature at which the material film 12d can be sufficiently stretched. A temperature in the pre-heating chamber 6b is approximately 115° C. to 125° C.

The material film 12d having been pre-heated is then sequentially transferred from the pre-heating chamber 6b to the first stretching chamber 6c, the second stretching chamber 6d, and the third stretching chamber 6e. In each of the first stretching chamber 6c, the second stretching chamber 6d, and the third stretching chamber 6e, the material film 12d is stretched in the transverse direction TD while being heated. A temperature in each of the first stretching chamber 6c, the second stretching chamber 6d, and the third stretching chamber 6e is approximately 100° C. to 115° C.

In a case where the material film 12d is made of a polyethylene-based resin, there is a tendency that it is possible to more uniformly stretch the material film 12d by stretching the material film 12d, having been pre-heated, at a temperature lower than a temperature to which the material film 12d has been pre-heated. This consequently makes it possible to obtain a separator original sheet 12c which is excellent in uniformity in thickness and uniformity in phase difference. Therefore, in a case where the material film 12d is made of a polyethylene-based resin, the temperature in each of the first stretching chamber 6c, the second stretching chamber 6d, and the third stretching chamber 6e is preferably 10° C. to 25° C. lower than the temperature in the pre-heating chamber 6b.

In the first stretching chamber 6c, the second stretching chamber 6d, and the third stretching chamber 6e, the material film 12d is stretched by increasing, in the transverse direction TD, a distance between (i) the chucks C which are located on one side and are holding one of the sides of the material film 12d and (ii) the chucks C which are located on an opposite side and are holding the other one of the sides of the material film 12d. That is, the chucks C which are located on the one side become distant, in the transverse direction TD, from the chucks C which are located on the opposite side, while moving in the machine direction MD, so that the material film 12d is pulled and stretched in the transverse direction TD. This consequently causes the material film 12d having the width W1 to be stretched so as to have a width W2 (which is, for example, substantially five times greater than the width W1). Note here that the stretching furnace 6 includes a plurality of stretching chambers (i.e., the first stretching chamber 6c, the second stretching chamber 6d, and the third stretching chamber 6e), and the plurality of stretching chambers have, as a whole, a great length (in the machine direction MD). A speed at which the material film 12d is deformed (stretched) (i.e., a strain rate [%/sec]) is (i) inversely proportional to a total length of the plurality of stretching chambers and (ii) proportional to a speed at which the material film 12d is transferred (transferring speed). Therefore, by increasing the total length of the plurality of stretching chambers, it is possible to increase the transferring speed while maintaining the strain rate. This allows an improvement in productivity.

The material film 12d having been stretched is then transferred into the heat-fixing chamber 6f. In the heat-fixing chamber 6f, the material film 12d having been stretched is heated to a given temperature while the width W2 of the material film 12d having been stretched is maintained. This causes an improvement in thermal stability of the material film 12d having been stretched. A temperature in the heat-fixing chamber 6f is approximately 115° C. to 130° C.

The material film 12d having been subjected to heat fixation in the heat-fixing chamber 6f is transferred into the back chamber 6g, and then transferred out of the stretching furnace 6 through the exit 62. Note that the exit 62 has a width which is set so that (i) the separator original sheet 12c and (ii) the tenter rails R, each of which is provided so as to be looped, can be laid in the exit 62. The exit 62 has a height which is set to approximately 25 cm.

As described above, the separator original sheet 12c which is to be used as a base material of a separator 12 can be obtained by stretching, in the transverse direction TD, the material film 12d in the stretching furnace 6 of the film-stretching apparatus 5.

Note, here, that a conventional film-stretching apparatus has the following problem. That is, in a case where a material film is heated, a component (i.e., a volatile component) contained in the material film, which component is in a liquid or solid state at a room temperature, is volatilized from the material film. The component thus volatilized is likely to be condensed and deposited in a stretching furnace, and then drop or fall on the material film. This may cause damage to the material film.

Examples of the component, which is contained in the material film and which is in a liquid or solid state at a room temperature, include: polyolefin processing aids; antioxidants and denatured antioxidants; polyolefin plasticizing agents; subsidiary substances each contained in a petroleum-derived polyolefin plasticizing agent; cleaning solvents each used to clean a film or a roll of the film prior to the stretching step; stabilizing agents each of which is added to a cleaning agent which prevents propagation, rot, oxidization, and/or decomposition of an organism; antistatic agents; and the like. Each of those components can be added in any of the kneading step S1, the sheet-forming step S2, the removing step S3, and the stretching step S4.

Examples of the polyolefin processing aids include: higher fatty acids such as lauric acid and stearic acid; and metallic salts thereof. Examples of the antioxidants and the denatured antioxidants include: antioxidants such as a phenolic antioxidant and a phosphorous antioxidant; and denatured antioxidants such as a denatured phenolic antioxidant and a denatured phosphorous antioxidant. Examples of the polyolefin plasticizing agents include: hydrocarbons such as liquid paraffin and paraffin wax; esters such as dioctyl phthalate and dibutyl phthalate; and higher alcohols such as oleyl alcohol and stearyl alcohol. Examples of the subsidiary substances each contained in a petroleum-derived polyolefin plasticizing agent include subsidiary substances each contained in a petroleum-derived polyolefin plasticizing agent such as liquid paraffins such as an olefin compound, a naphthene compound, and an (polynuclear) aromatic compound. Examples of the cleaning solvents each used to clean a film or a roll of the film prior to the stretching step include: water; alcohols such as methanol, ethanol, and isopropanol; halogenated hydrocarbons such as methylene chloride; and hydrocarbons, such as hexane and heptane, each of which is in a liquid state at a room temperature. Examples of the stabilizing agents, each of which is added to a cleaning agent which prevents propagation, rot, oxidization, and/or decomposition of an organism, include alcohols such as methanol and isopropanol. Examples of the antistatic agents include: water; and alcohols such as methanol, ethanol, and isopropanol.

In view of the above problem, the film-stretching apparatus 5 in accordance with Embodiment 1 is configured such that an airflow in each of the entrance 61 and the exit 62 of the stretching furnace 6 is controlled so as to be directed toward an outside of the stretching furnace 6. This makes it possible to prevent cold external air from entering the stretching furnace 6 through each of the entrance 61 and the exit 62 of the stretching furnace 6. As a result, the volatile component is prevented from being condensed and deposited in the stretching furnace 6, and consequently damage to the material film is reduced.

Specifically, according to the film-stretching apparatus 5, the front chamber 6a for preventing cold external air from entering the stretching furnace 6 through the entrance 61 is provided on the entrance 61 side of the stretching furnace 6. A pressure in the front chamber 6a connected to the entrance 61 is controlled so as to be sufficiently higher than an atmospheric pressure (i.e., so as to be a positive pressure). This causes, in the entrance 61, an airflow directed toward the outside of the stretching furnace 6, and consequently prevents cold external air from entering the stretching furnace 6 through the entrance 61. As a result, the volatile component is prevented from being condensed and deposited in the stretching furnace 6, particularly in the vicinity of the entrance 61. Similarly, the back chamber 6g for preventing cold external air from entering the stretching furnace 6 through the exit 62 is provided on the exit 62 side of the stretching furnace 6. A pressure in the back chamber 6g connected to the exit 62 is controlled so as to be sufficiently higher than the atmospheric pressure (i.e., so as to be a positive pressure). This causes, in the exit 62, an airflow directed toward the outside of the stretching furnace 6, and consequently prevents cold external air from entering the stretching furnace 6 through the exit 62. The volatile component is therefore prevented from being condensed and deposited in the stretching furnace 6, particularly in the vicinity of the exit 62.

A difference between a pressure in the stretching furnace 6 (i.e., the pressure in each of the front chamber 6a and the back chamber 6g) and the atmospheric pressure is preferably not smaller than 2 Pa, more preferably not smaller than 5 Pa, and still more preferably not smaller than 10 Pa. In a case where such a pressure difference is smaller than 2 Pa, it is difficult to prevent cold external air from entering the stretching furnace 6, because the pressure in the stretching furnace 6 is substantially equal to the atmospheric pressure. By making the above-described difference between the pressure in the stretching furnace 6 and the atmospheric pressure, it is possible to cause an airflow which has an airflow rate of not less than 0.5 m/sec and which is directed toward the outside of the stretching furnace 6. Particularly, the airflow in the entrance 61 preferably has an airflow rate of not smaller than 1.0 m/sec because the volatile component is volatilized in a larger amount in the pre-heating chamber 6b of the stretching furnace 6.

By thus (i) providing, in the stretching furnace 6, the front chamber 6a, which is connected to the entrance 61, and the back chamber 6g, which is connected to the exit 62, and (ii) controlling the pressure in each of the front chamber 6a and the back chamber 6g so as to be higher than the atmospheric pressure (i.e., so as to be a positive pressure), it is possible to suitably control an airflow in each of the entrance 61 and the exit 62 so as to be directed toward the outside of the stretching furnace 6.

FIG. 8A is a cross-sectional view illustrating an airflow AF in the entrance 61 of the stretching furnace 6. FIG. 8B is a cross-sectional view illustrating an airflow AF in the exit 62 of the stretching furnace 6. Each of FIG. 8A-8B illustrates a cross section of the film-stretching apparatus 5 which cross section is obtained by cutting the film-stretching apparatus 5 along a plane perpendicular to the transverse direction TD.

By controlling the pressure in the front chamber 6a, connected to the entrance 61, so as to be a positive pressure, it is possible to control the airflow AF in the entrance 61 so as to be directed toward the outside of the stretching furnace 6 (see FIG. 8A). Similarly, by controlling the pressure in the back chamber 6g, connected to the exit 62, so as to be a positive pressure, it is possible to control the airflow AF in the exit 62 so as to be directed toward the outside of the stretching furnace 6 (see FIG. 8B). This prevents cold external air from entering the stretching furnace 6 through the entrance 61 and the exit 62, and consequently prevents a volatile component VC from being condensed and deposited in the stretching furnace 6. It is therefore possible to reduce damage to the material film 12d which damage is caused by condensation and deposition of the volatile component VC in the stretching furnace 6.

FIG. 9 is a cross-sectional view illustrating an example configuration in the vicinity of the entrance 61 of the stretching furnace 6 of the film-stretching apparatus 5. FIG. 9 illustrates a cross section of the film-stretching apparatus which cross section is obtained by cutting the film-stretching apparatus 5 along a plane parallel to the machine direction MD and the transverse direction TD.

According to the film-stretching apparatus 5, the chucks C provided on the tenter rails R, which chucks C move in loops in the stretching furnace 6, are configured so as to (i) hold, on the outside of the stretching furnace 6, the both sides of the material film 12d and (ii) transfer the material film 12d into the stretching furnace 6 through the entrance 61. While the chucks C are moving outside the stretching furnace 6, the chucks C are exposed to external air. This causes a decrease in temperature of the chucks C moving outside the stretching furnace 6. It is therefore likely that the volatile component VC having been discharged through the entrance 61 is condensed and adheres to the chucks C moving outside the stretching furnace 6. The volatile component VC adhering to the chucks C may drop or fall on the material film 12d from the chucks C, and consequently cause damage the material film 12d.

In order that such damage to the material film 12d is reduced, the temperature of the chucks C, moving outside the stretching furnace 6, is kept at a temperature of preferably not lower than approximately 90° C. and not higher than approximately 150° C., more preferably not lower than approximately 100° C. and not higher than approximately 120° C. In a case where the temperature of the chucks C is lower than 90° C. to 100° C., it is difficult to sufficiently prevent the volatile component VC, having been discharged through the exit 62, from being condensed and adhering to the chucks C. In such a case, it is not possible to effectively reduce the damage to the material film 12d. Meanwhile, in a case where the temperature of the chucks C is higher than 120° C. to 150° C., the material film 12d is highly likely to be damaged due to heat, depending on a type of the material film 12d. This may cause part of the material film 12d which part is held by the chucks C to be locally melted, so that a stretching force may not be transmitted to the entire material film 12d. Therefore, it is possible to suitably reduce the damage to the material film 12d by keeping the temperature of the chucks C, moving outside the stretching furnace 6, at a temperature of preferably not lower than approximately 90° C. and not higher than approximately 150° C., more preferably not lower than approximately 100° C. and not higher than approximately 120° C.

Particularly, a lower limit of the temperature of the chucks C is 90° C., preferably 100° C., and more preferably 110° C., and an upper limit of the temperature of the chucks C is 150° C., preferably 140° C., more preferably 130° C., and still more preferably 120° C.

Note that examples of a method of keeping the temperature of the chucks C, moving outside the stretching furnace 6, at a temperature of not lower than approximately 90° C. and not higher than approximately 150° C. or at a temperature of not lower than approximately 100° C. and not higher than approximately 120° C. encompass a method in which the chucks C are heated by use of, for example, a heater.

(Summary of Film-Stretching Apparatus)

As described above, the film-stretching apparatus 5 in accordance with Embodiment 1 includes the stretching furnace 6, which has (i) the entrance 61 through which the material film 12d is transferred into the stretching furnace 6 and (ii) the exit 62 through which the material film 12d (separator original sheet 12c) having been stretched is transferred out of the stretching furnace 6. The airflow AF in each of the entrance 61 and the exit 62 is controlled so as to be directed toward the outside of the stretching furnace 6.

According to the film-stretching apparatus 5, the airflow AF in each of the entrance 61 and the exit 62 of the stretching furnace 6 is controlled so as to be directed toward the outside of the stretching furnace 6. This makes it possible to prevent the volatile component VC, having been volatilized from the material film 12d, from being condensed and deposited in the stretching furnace 6, particularly in the vicinity of each of the entrance 61 and the exit 62.

Therefore, according to Embodiment 1, it is possible to realize the film-stretching apparatus 5 which allows a reduction in damage to a film which damage is caused by condensation and deposition of the volatile component VC in the stretching furnace 6.

Embodiment 1 has discussed a configuration in which the stretching furnace 6 includes both of (i) the front chamber 6a for preventing external air from entering the stretching furnace 6 through the entrance 61 and (ii) the back chamber 6g for preventing external air from entering the stretching furnace 6 through the exit 62. The present invention is, however, not limited to such a configuration. An amount of the volatile component VC which is volatilized by heating the material film 12d in the stretching furnace 6 is relatively larger on the entrance 61 side of the stretching furnace 6 than on the exit 62 side of the stretching furnace 6. It follows that, by controlling the airflow AF at least in the entrance 61 of the stretching furnace 6 so as to be directed toward the outside of the stretching furnace 6, it is possible to sufficiently reduce damage to a film which damage is caused by condensation and deposition of the volatile component VC in the vicinity of the entrance 61 inside the stretching furnace 6. The back chamber 6g is therefore not essential, and can be alternatively omitted.

Embodiment 1 has discussed a configuration in which the temperature in each of the front chamber 6a and the back chamber 6g of the stretching furnace 6 is not controlled. The present invention is, however, not limited to such a configuration. Alternatively, the present invention can be configured such that the temperature in each of the front chamber 6a and the back chamber 6g is also independently controllable. By heating the front chamber 6a and the back chamber 6g, it is possible to more effectively prevent external air from entering the stretching furnace 6 through the entrance 61 and the exit 62. That is, since volume of air in each of the front chamber 6a and the back chamber 6g is increased by heating each of the front chamber 6a and the back chamber 6g, an amount of air flowing toward the outside of the stretching furnace 6 is increased. This makes it possible to effectively prevent the volatile component VC from being condensed and deposited in the vicinity of each of the entrance 61 and the exit 62 inside the stretching furnace 6. By causing the operating temperature to be independently controllable in each of the front chamber 6a and the back chamber 6g, it is possible to use the front chamber 6a and the back chamber 6g to heat the material film 12d in a case where time for pre-heating or heat fixation is insufficient.

Embodiment 1 has discussed the film-stretching apparatus 5 as an example configuration of an uniaxial stretching apparatus which stretches the material film 12d in the width direction (i.e., the transverse direction TD). The present invention is, however, not limited to such a configuration. Alternatively, the film-stretching apparatus in accordance with an embodiment of the present invention can be a simultaneous biaxial stretching apparatus which stretches the material film 12d simultaneously in a longitudinal (length) direction (i.e., the machine direction MD) and the width direction (i.e., the transverse direction TD).

Embodiment 2

The following description will discuss Embodiment 2 of the present invention with reference to FIGS. 10 and 11A-11B. In Embodiment 2, described will be an example of a method (film production method) of producing a separator for a lithium ion secondary battery in which method a separator original sheet obtained in Embodiment 1 is used as a base material.

(Method of Producing Separator)

FIG. 10 is a flowchart schematically showing a method of producing a separator. The separator is configured such that a functional layer is stacked on a separator original sheet 12c which serves as a base material. Examples of the functional layer encompass a heat-resistant layer and an adhesive layer.

The functional layer is stacked on the separator original sheet 12c by (i) coating the separator original sheet 12c with a coating material (a material) or the like corresponding to the functional layer and then (ii) drying the coating material.

FIG. 10 shows, as an example, a flow of producing a heat-resistant separator 12a in a case where the functional layer is a heat-resistant layer 4. The flow shown in FIG. 10 is an example of a flow in which a wholly aromatic polyamide (aramid resin) is employed as a material of the heat-resistant layer 4 and such a heat-resistant layer 4 is stacked on the separator original sheet 12c.

The flow includes a first inspecting step S11, a coating step S12, a depositing step S13, a cleaning step S14, a drying step S15, a second inspecting step S16, and a slitting step S17.

The steps S11 through S17, which follow the above-described flow of producing the separator original sheet 12c, will be described in order below.

(First Inspecting Step S11)

The first inspecting step S11 is a step of inspecting the separator original sheet 12c, obtained in Embodiment 1, before carrying out the subsequent coating step.

(Coating Step S12)

The coating step S12 is a step of coating, with a coating material (a material) to be the heat-resistant layer 4, the separator original sheet 12c having been inspected in the first inspecting step S11. In the coating step S12, such coating can be carried out with respect to only one of surfaces of the separator original sheet 12c or can alternatively be carried with respect to each of the surfaces of the separator original sheet 12c.

For example, in the coating step S12, the separator original sheet 12c is coated with a solution obtained by dissolving an aramid in NMP (N-methyl-pyrrolidone), as the coating material to be the heat-resistant layer 4. Note that the heat-resistant layer 4 is not limited to an aramid heat-resistant layer. For example, the separator original sheet 12c can alternatively be coated with a suspension of alumina, carboxymethyl cellulose, and water, as the coating material to be the heat-resistant layer 4.

A method of coating the separator original sheet 12c with the coating material is not particularly limited as long as uniform wet coating can be performed with respect to the separator original sheet 12c by the method, and various methods can be employed.

For example, it is possible to employ any of methods such as a capillary coating method, a slit die coating method, a spray coating method, a dip coating method, a roll coating method, a screen printing method, a flexo printing method, a bar coater method, a gravure coater method, and a die coater method.

The material of the heat-resistant layer 4 with which material the separator original sheet 12c is coated has a film thickness that can be controlled by adjusting a thickness of a coating wet film and a solid-content concentration of the coating material.

(Depositing Step S13)

The depositing step S13 is a step of solidifying the coating material with which the separator original sheet 12c has been coated in the coating step S12. In a case where the coating material is an aramid coating material, for example, water vapor is applied to a coated surface so that an aramid is solidified by humidity deposition. This provides a heat-resistant separator original sheet 12b (see FIGS. 11A-11B) in which the heat-resistant layer 4 is formed on the separator original sheet 12c.

(Cleaning Step S14)

The cleaning step S14 is a step of cleaning the heat-resistant separator original sheet 12b obtained by solidifying the coating material in the depositing step S13. In a case where the heat-resistant layer 4 is an aramid heat-resistant layer, for example, water, an aqueous solution, or an alcohol-based solution is suitably used as a cleaning liquid.

Note that, in the cleaning step S14, multistage cleaning can be carried out, that is, cleaning can be carried out a plurality of times in order to enhance a cleaning effect.

Note also that, after the cleaning step S14, a water removing step can be carried out which is a step of removing water from the heat-resistant separator original sheet 12b having been cleaned in the cleaning step S14. A purpose of removing the water is to remove water or the like, adhering to the heat-resistant separator original sheet 12b, before carrying out the subsequent drying step S15 so that drying can be carried out more easily and insufficient drying can be prevented.

(Drying Step S15)

The drying step S15 is a step of drying the heat-resistant separator original sheet 12b having been cleaned in the cleaning step S14. A method of drying the heat-resistant separator original sheet 12b is not particularly limited, and, for example, it is possible to employ various methods such as (i) a method in which the heat-resistant separator original sheet 12b is brought into contact with a heated roller or (ii) a method in which hot air is blown onto the heat-resistant separator original sheet 12b.

(Second Inspecting Step S16)

The second inspecting step S16 is a step of inspecting the heat-resistant separator original sheet 12b having been dried in the drying step S15. In inspection, a defect is marked as appropriate, and it is therefore possible to efficiently prevent the heat-resistant separator original sheet 12b from having a defect.

(Slitting Step S17)

The slitting step S17 is a step of slitting (cutting) the heat-resistant separator original sheet 12b, having been inspected in the second inspecting step S16, into pieces each having a predetermined product width. Specifically, in the slitting step S17, the heat-resistant separator original sheet 12b is slit into pieces each having a product width which is a width suitable for a product, such as a lithium ion secondary battery 1, to which each of the pieces is to be applied.

Each of FIGS. 11A-11B is a diagram schematically illustrating an example of the slitting step S17. The slitting step S17 is carried out by use of a slitting apparatus 9 which slits the heat-resistant separator original sheet 12b (see FIGS. 11A-11B).

The slitting apparatus 9 includes a wind-off roller 91, rollers 92 through 95, and a plurality of take-up rollers 96. Each of the wind-off roller 91, the rollers 92 through 95, and the plurality of take-up rollers 96 has a columnar shape, and is rotatably supported. The slitting apparatus 9 also includes a plurality of blades (not illustrated). A roll 10 is fitted to the wind-off roller 91. The roll 10 is a roll of the heat-resistant separator original sheet 12b which roll is obtained by winding the heat-resistant separator original sheet 12b on an outer peripheral surface of a core 97 so as to be layered.

In order to increase productivity, the heat-resistant separator original sheet 12b is usually produced so as to have a width that is not smaller than the product width. After the heat-resistant separator original sheet 12b is produced, the heat-resistant separator original sheet 12b is slit into heat-resistant separators 12a each having the product width.

Specifically, in the slitting step S17, the heat-resistant separator original sheet 12b is wound off from the core 97 to a path U or a path L. The heat-resistant separator original sheet 12b thus wound off is transferred to the roller 94 via the rollers 92 and 93. In a step of transferring the heat-resistant separator original sheet 12b, the heat-resistant separator original sheet 12b is slit substantially parallel to the machine direction MD. As a result, a plurality of heat-resistant separators 12a, into which the heat-resistant separator original sheet 12b has been slit so as to have the product width, are produced.

The plurality of heat-resistant separators 12a thus produced are wound on respective cores 98 fitted on the take-up rollers 96.

[Supplementary Notes]

A film-stretching apparatus in accordance with an aspect of the present invention is a film-stretching apparatus for stretching a film, including: a stretching furnace having (i) an entrance through which the film is transferred into the stretching furnace and (ii) an exit through which the film is transferred out of the stretching furnace, an airflow in the entrance being controlled so as to be directed toward an outside of the stretching furnace.

In a case where the film is heated in the stretching furnace, a volatile component contained the film is volatilized. An amount of the volatile component which is volatilized is relatively larger on an entrance side of the stretching furnace than on an exit side of the stretching furnace. According to the above configuration, the airflow in the entrance of the stretching furnace is controlled so as to be directed toward the outside of the stretching furnace. This makes it possible to prevent external air from entering the stretching furnace through the entrance. Consequently, the volatile component having been volatilized from the film is prevented from being condensed and deposited in the stretching furnace, particularly in the vicinity of the entrance or the like. The above configuration therefore makes it possible to realize a film-stretching apparatus which allows a reduction in damage to the film which damage is caused by condensation and deposition of the volatile component in the stretching furnace.

The film-stretching apparatus in accordance with an aspect of the present invention can be configured such that a pressure in the stretching furnace is controlled so as to be a positive pressure.

The above configuration makes it possible to suitably control the airflow in the entrance so as to be directed toward the outside of the stretching furnace, by controlling the pressure in the stretching furnace so as to be a positive pressure. It is therefore possible to prevent external air from entering the stretching furnace through the entrance.

The film-stretching apparatus in accordance with an aspect of the present invention can be configured such that the stretching furnace is divided, along a direction in which the film is transferred, into a plurality of air amount control zones in each of which an amount of air is independently controllable; and a pressure in one of the plurality of air amount control zones which one is connected to the entrance is controlled so as to be a positive pressure.

The above configuration makes it possible to prevent external air from entering the stretching furnace through the entrance, by controlling the pressure at least in the one of the plurality of air amount control zones, which one is connected to the entrance, so as to be a positive pressure. Furthermore, by independently controlling a pressure in each of the others of the plurality of air amount control zones, it is possible to control the pressure in each of the others of the plurality of air amount control zones so as to be an optimal pressure, depending on contents of a process to be carried out with respect to the film in the stretching furnace.

The film-stretching apparatus in accordance with an aspect of the present invention can be configured such that an airflow in the exit is controlled so as to be directed toward the outside of the stretching furnace.

According to the above configuration, the airflow in the exit of the stretching furnace is controlled so as to be directed toward the outside of the stretching furnace. This makes it possible to prevent external air from entering the stretching furnace through the exit. Consequently, the volatile component having been volatilized from the film is prevented from being condensed and deposited in the vicinity of the exit inside the stretching furnace. The above configuration therefore makes it possible to reduce damage to the film which damage is caused by condensation and deposition of the volatile component in the vicinity of the exit inside the stretching furnace.

The film-stretching apparatus in accordance with an aspect of the present invention can be configured such that a pressure in the stretching furnace is controlled so as to be a positive pressure.

The above configuration makes it possible to suitably control the airflow in the exit to be directed toward the outside of the stretching furnace, by controlling the pressure in the stretching furnace so as to be a positive pressure. It is therefore possible to prevent external air from entering the stretching furnace through the exit.

A method of producing a film in accordance with an aspect of the present invention includes: a film stretching step of stretching a film, the film stretching step being carried out by use of a film-stretching apparatus which includes a stretching furnace having (i) an entrance through which the film is transferred into the stretching furnace and (ii) an exit through which the film is transferred out of the stretching furnace, in the film stretching step, an airflow in the entrance being controlled so as to be directed toward an outside of the stretching furnace.

According to the above method, in the film stretching step, the airflow in the entrance is controlled so as to be directed toward the outside of the stretching furnace. This makes it possible to prevent cold external air from entering the stretching furnace through the entrance. Consequently, the volatile component having been volatilized from the film is prevented from being condensed and deposited in the stretching furnace, particularly in the vicinity of the entrance. The above method therefore makes it possible to realize a method of producing a film which method allows a reduction in damage to the film which damage is caused by condensation and deposition of the volatile component in the stretching furnace.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

5: Film-stretching apparatus
6: Stretching furnace
61: Entrance
62: Exit
6a: Front chamber (air amount control zone)
6g: Back chamber (air amount control zone)
12c: Separator original sheet (film)
12d: Material film (film)
S4: Stretching step (film stretching step)
AF: Airflow
MD: Machine direction

The invention claimed is:

1. A method of producing a film having a porous structure, the film being configured to be used as separator for a nonaqueous electrolyte secondary battery, the method comprising:
 a film stretching step of stretching a film by use of a film-stretching apparatus which includes a stretching furnace having (i) an entrance through which the film is transferred into the stretching furnace and (ii) an exit through which the film is transferred out of the stretching furnace; and
 a transfer step of holding, on the outside of the stretching furnace, both sides of the film with use of chucks and transferring the film into the stretching furnace through the entrance,
  wherein, in the film stretching step, an airflow in the entrance is controlled so as to be directed toward an outside of the stretching furnace, the airflow containing a plasticizing agent volatilized from the film,
  wherein, in the transfer step, while the chucks are moving outside of the stretching furnace, a temperature of the chucks is kept at not lower than 90° C. and not higher than 150° C.,
  wherein the stretching furnace is divided, along a direction in which the film is transferred, into a plurality of air amount control zones, one of the plurality of air amount control zones being a zone connected to the entrance,
  wherein the method further comprises independently controlling an amount of air in each of the plurality of air amount control zones,
  wherein the plurality of air amount control zones include at least a pre-heating chamber and a stretching chamber,
  wherein each of the pre-heating chamber and the stretching chamber supplies and discharges air, and
  wherein a pressure in at least the zone connected to the entrance is controlled so as to be a positive pressure, and wherein the produced film has the porous structure.

2. The method as set forth in claim 1, further comprising controlling a pressure in the entire stretching furnace to be a positive pressure.

3. The method as set forth in claim 2, wherein a difference between the pressure in the stretching furnace and atmospheric pressure is not smaller than 2 Pa.

4. The method as set forth in claim 3, wherein the airflow directed toward the outside of the stretching furnace has an airflow rate of not less than 0.5 m/sec.

5. The method as set forth in claim 1, further comprising, in the film stretching step, controlling an airflow in the exit so as to be directed toward the outside of the stretching furnace.

6. The method as set forth in claim 5, further comprising controlling a pressure in the entire stretching furnace to be a positive pressure.

7. The method as set forth in claim 6, wherein a difference between the pressure in the stretching furnace and atmospheric pressure is not smaller than 2 Pa.

8. The method as set forth in claim 7, wherein the airflow in the exit directed toward the outside of the stretching furnace has an airflow rate of not less than 0.5 m/sec.

9. The method as set forth in claim 1, further comprising independently controlling an operating temperature of each of the air amount control zones.

10. The method as set forth in claim 1, wherein the plurality of air amount control zones includes a pre-heating chamber and at least a first stretching chamber.

11. The method as set forth in claim 10, wherein a temperature in the pre-heating chamber is controlled within a range of 115° C. to 125° C. and wherein a temperature in the at least first stretching chamber is controlled within a range of 100° C. to 115° C.

12. The method as set forth in claim 10, wherein the plurality of air amount control zones includes a heat-fixing chamber in which the film which has been stretched is heated while a width of the film which has been stretched is maintained.

13. The method as set forth in claim 12, wherein a temperature in the heat-fixing chamber is controlled within a range of 115° C. to 130° C.

14. The method as set forth in claim 1, further comprising pre-heating the film in the stretching furnace prior to stretching the film.

15. The method as set forth in claim 14, wherein the film comprises a polyethylene-based resin.

16. The method as set forth in claim 15, wherein the film stretching step is carried out at a temperature which is lower than a temperature to which the film has been pre-heated.

17. The method as set forth in claim 1, wherein the film is uniaxially or biaxially stretched in the stretching furnace.

18. The method as set forth in claim 1, wherein a speed [%/sec] at which the film is stretched is proportional to a speed at which the film is transferred through the film-stretching apparatus.

* * * * *